United States Patent
Sakai et al.

(10) Patent No.: US 11,314,991 B2
(45) Date of Patent: Apr. 26, 2022

(54) INFORMATION DISPLAY METHOD, INFORMATION DISPLAY SYSTEM, AND STORAGE MEDIUM

(71) Applicants: Kabushiki Kaisha Toshiba, Minato-ku (JP); Toshiba Digital Solutions Corporation, Kawasaki (JP)

(72) Inventors: Saki Sakai, Yokohama (JP); Yeonsoo Yang, Machida (JP); Tamotsu Sato, Yokohama (JP); Hiroyuki Mizutani, Yokohama (JP); Taisuke Yamanaka, Shinjuku (JP)

(73) Assignees: Kabushiki Kaisha Toshiba, Minato-ku (JP); Toshiba Digital Solutions Corporation, Kawasaki (JP)

(*) Notice: Subject to any disclaimer, the term of this patent is extended or adjusted under 35 U.S.C. 154(b) by 153 days.

(21) Appl. No.: 16/797,546

(22) Filed: Feb. 21, 2020

(65) Prior Publication Data

US 2020/0272850 A1 Aug. 27, 2020

(30) Foreign Application Priority Data

Feb. 22, 2019 (JP) .............................. JP2019-030593

(51) Int. Cl.
*G06K 9/62* (2022.01)
*G06N 20/00* (2019.01)

(52) U.S. Cl.
CPC ........... *G06K 9/627* (2013.01); *G06K 9/6215* (2013.01); *G06K 9/6256* (2013.01); *G06K 9/6296* (2013.01); *G06N 20/00* (2019.01)

(58) Field of Classification Search
CPC ............................. G06K 9/627; G06K 9/6215
See application file for complete search history.

(56) References Cited

U.S. PATENT DOCUMENTS 6,826,124 B2    11/2004   Born

FOREIGN PATENT DOCUMENTS

| JP | 4520728 B2 | 8/2010 |
|---|---|---|
| JP | 5246066 B2 | 7/2013 |

*Primary Examiner* — Tuan H Nguyen
(74) *Attorney, Agent, or Firm* — Oblon, McClelland, Maier & Neustadt, L.L.P.

(57) ABSTRACT

An information display method includes converting P (P≥2) high-dimensional data respectively obtained from P images each tagged with a label representing a result of classification into one of a plurality of classes to respectively acquire P low-dimensional data, generating a plot diagram including P plot points obtained by visualizing the P low-dimensional data each depending on the classification result, generating auxiliary information corresponding to a base point set as one of the plot points included in the plot diagram and N (1≤N<P) reference points respectively set as the plot points corresponding to the N low-dimensional data extracted from among the low-dimensional data, belonging to a same class as a class to which the base point belongs, among the P low-dimensional data, and generating a display image including the plot diagram to which the auxiliary information is added.

11 Claims, 14 Drawing Sheets

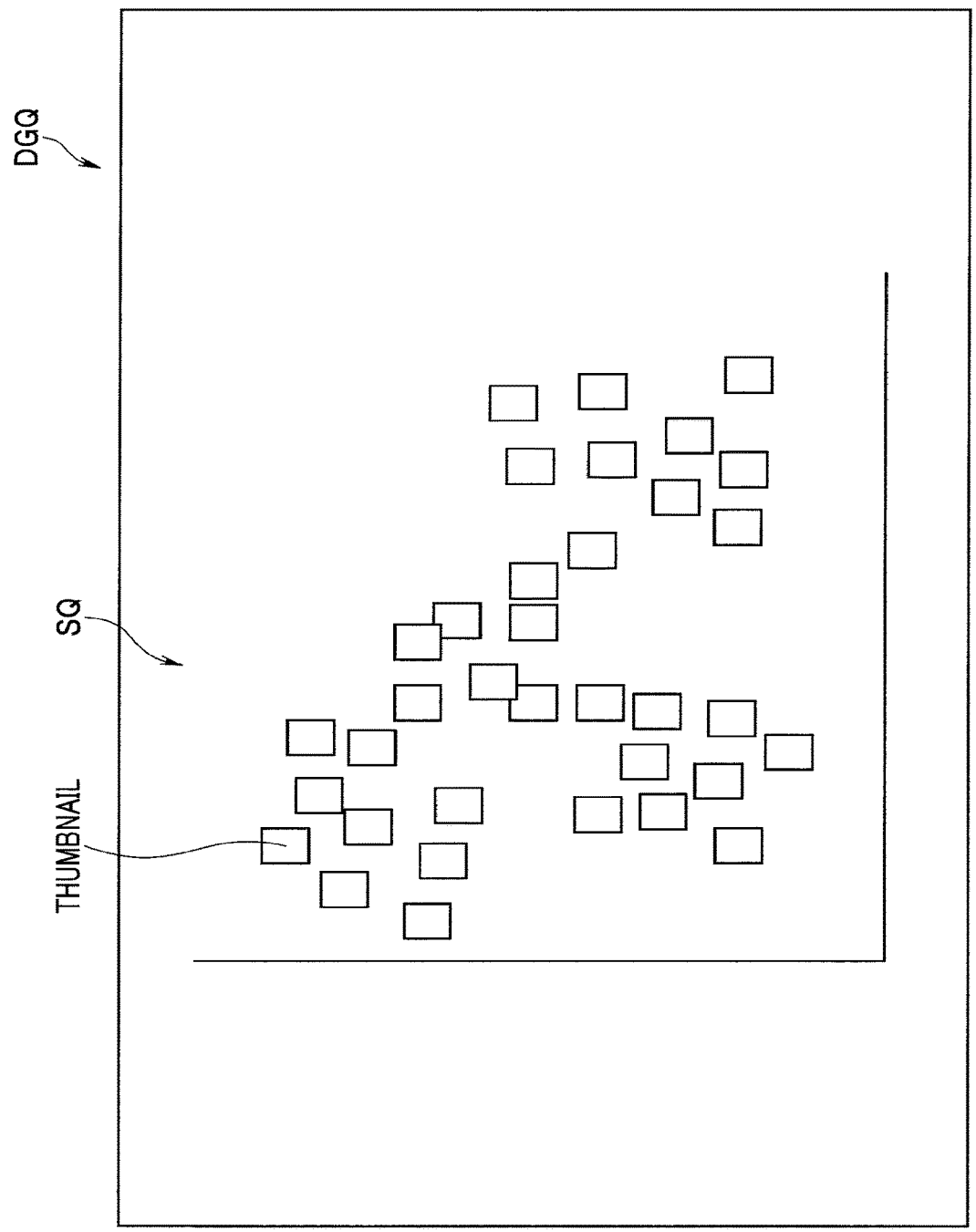

INFORMATION DISPLAY METHOD, INFORMATION DISPLAY SYSTEM, AND STORAGE MEDIUM

CROSS REFERENCE TO RELATED APPLICATION

This application is based upon and claims the benefit of priority from the prior Japanese Patent Application No. 2019-30593 filed in Japan on Feb. 22, 2019, the entire contents of which are incorporated herein by reference.

FIELD

An embodiment described herein relates generally to an information display method, an information display system, and a storage medium.

BACKGROUND

As an example of a learning method in creating a machine learning model, a learning method using learning data obtained by assigning a label representing a result of classification into one of a plurality of predetermined classes to original data such as image data has been conventionally known. When the machine learning model is created using the above-described learning method, work related to correction of the label included in the learning data has been performed to enhance accuracy of a processing result obtained by processing of the machine learning model.

However, the method conventionally known has a problem that the above-described work related to the correction of the label cannot be efficiently performed when the total number of learning data is enormous, for example.

BRIEF DESCRIPTION OF THE DRAWINGS

FIG. 6B is a diagram illustrating an example of a display image to be displayed depending on processing of the information display system according to the embodiment;

DETAILED DESCRIPTION

An information display method according to an embodiment includes converting P (P≥2) high-dimensional data respectively obtained from P images each tagged with a label representing a result of classification into one of a plurality of predetermined classes to respectively acquire P low-dimensional data, generating a plot diagram including P plot points obtained by visualizing the P low-dimensional data each depending on the classification result represented by the label, generating auxiliary information corresponding to a base point set as one of the plot points included in the plot diagram and N (1≤N<P) reference points respectively set as the plot points corresponding to the N low-dimensional data extracted in ascending order of differences from the one low-dimensional data used in visualizing the one plot point from among the low-dimensional data, belonging to a same class as a class to which the base point belongs, among the P low-dimensional data, and generating a display image including the plot diagram to which the auxiliary information is added.

The embodiment will be described below with reference to the drawings.

FIGS. 1 to 15 relate to the embodiment.

Figure 1:
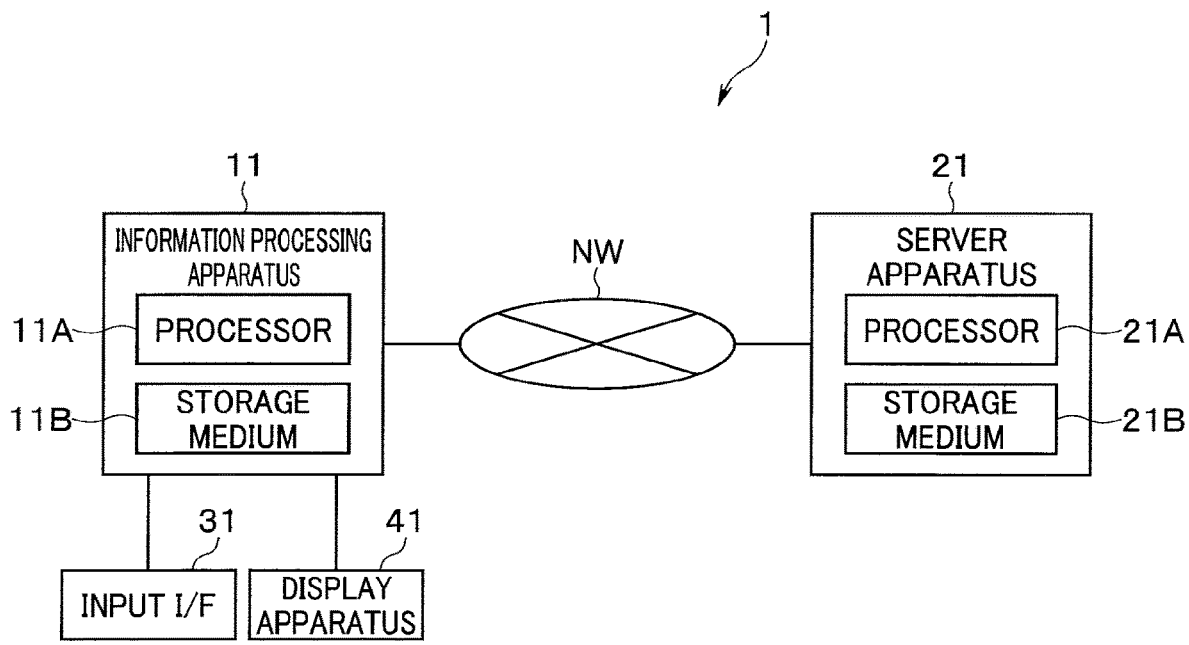
FIG. 1 is a diagram illustrating an example of a configuration of an information display system according to an embodiment.

An information display system 1 is configured to include an information processing apparatus 11, a server apparatus 21, an input I/F (interface) 31, and a display apparatus 41, as illustrated in FIG. 1. FIG. 1 is a diagram illustrating an example of the configuration of the information display system according to the embodiment.

The information processing apparatus 11 is configured as a computer including one or more processors 11A and a storage medium 11B, for example. The information processing apparatus 11 is connected to the server apparatus 21 via a network NW. The information processing apparatus 11 is configured to detect an instruction issued in the input I/F 31 and output the detected instruction to the server apparatus 21 via the network NW. The information processing apparatus 11 is configured to perform processing for generating a display image corresponding to the instruction issued in the input I/F 31 and display data to be outputted from the server apparatus 21 via the network NW and perform processing for displaying the generated display image on the display apparatus 41.

Note that the network NW may be a public network such as the Internet or may be a private network such as an intranet.

The server apparatus 21 is configured as a computer including one or more processors 21A and a storage medium 21B, for example. The server apparatus 21 is connected to the information processing apparatus 11 via the network NW. The server apparatus 21 is configured to perform processing for acquiring display data corresponding to an instruction to be outputted from the information processing apparatus 11 via the network NW and output the acquired data to the information processing apparatus 11 via the network NW.

The input I/F 31 is configured to include one or more input devices to be operated by a user, such as a mouse, a keyboard, and a touch panel. The input I/F 31 is configured to be able to output an instruction corresponding to the operation by the user to the information processing apparatus 11. More specifically, the input I/F 31 is configured to be able to output an instruction to display a two-dimensional scatter diagram on the display apparatus 41, an instruction to set a base point in the two-dimensional scatter diagram, an instruction to set the number of reference points in the two-dimensional scatter diagram, and the like to the information processing apparatus 11.

The display apparatus 41 is configured to include a liquid crystal monitor, for example. The display apparatus 41 is configured to be able to display a display image or the like to be outputted from the information processing apparatus 11 on a screen.

Figure 2:
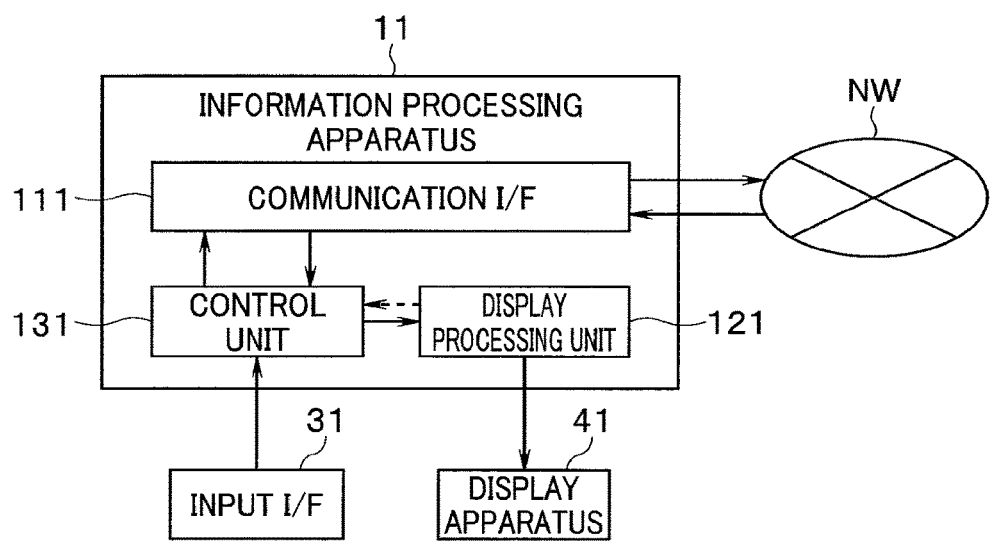
FIG. 2 is a diagram illustrating an example of a configuration of an information processing apparatus in the information display system according to the embodiment.

The information processing apparatus 11 is configured to include a communication I/F 111, a display processing unit 121, and a control unit 131, as illustrated in FIG. 2. FIG. 2 is a diagram illustrates an example of a configuration of the information processing apparatus in the information display system according to the embodiment.

The communication I/F 111 is configured to include a communication circuit that can be connected to the network NW, for example. The communication I/F 111 is configured to be able to perform wired or wireless communication with a communication I/F 211 (described below) in the server apparatus 21.

The display processing unit 121 is configured to generate a display image corresponding to control by the control unit 131 and output the generated display image to the display apparatus 41.

The control unit 131 is configured to perform an operation for detecting the instruction issued in the input I/F 31 and transmitting the detected instruction to the server apparatus 21 from the communication I/F 111. The control unit 131 is configured to transmit the instruction issued in the input I/F 31 and then acquire display data received in the communication I/F 111. The control unit 131 is configured to subject the display processing unit 121 to control to display a display image corresponding to the instruction issued in the input I/F 31 and the display data received in the communication I/F 111.

Note that in the present embodiment, functions of at least some of the respective units included in the information processing apparatus 11 may be implemented by hardware including the processor 11A and the storage medium 11B. Alternatively, in the present embodiment, a program for implementing the functions of at least some of the respective units included in the information processing apparatus 11 is stored in the storage medium 11B and the processor 11A may read and execute the program. Examples of the computer readable storage medium 11B include an optical disk such as a CD-ROM, a phase change type optical disk such as a DVD-ROM, a magneto-optical disk such as an MO (magneto optical) or an MD (mini disk), a magnetic disk such as a floppy (registered trademark) disk or a removable hard disk, and a memory card such as a compact flash (registered trademark), a smart media, an SD memory card, or a memory stick. A hardware device such as an integrated circuit (an IC chip, etc.) configured by being specially designed for the purpose of the present embodiment is also included as a storage medium.

Figure 3:
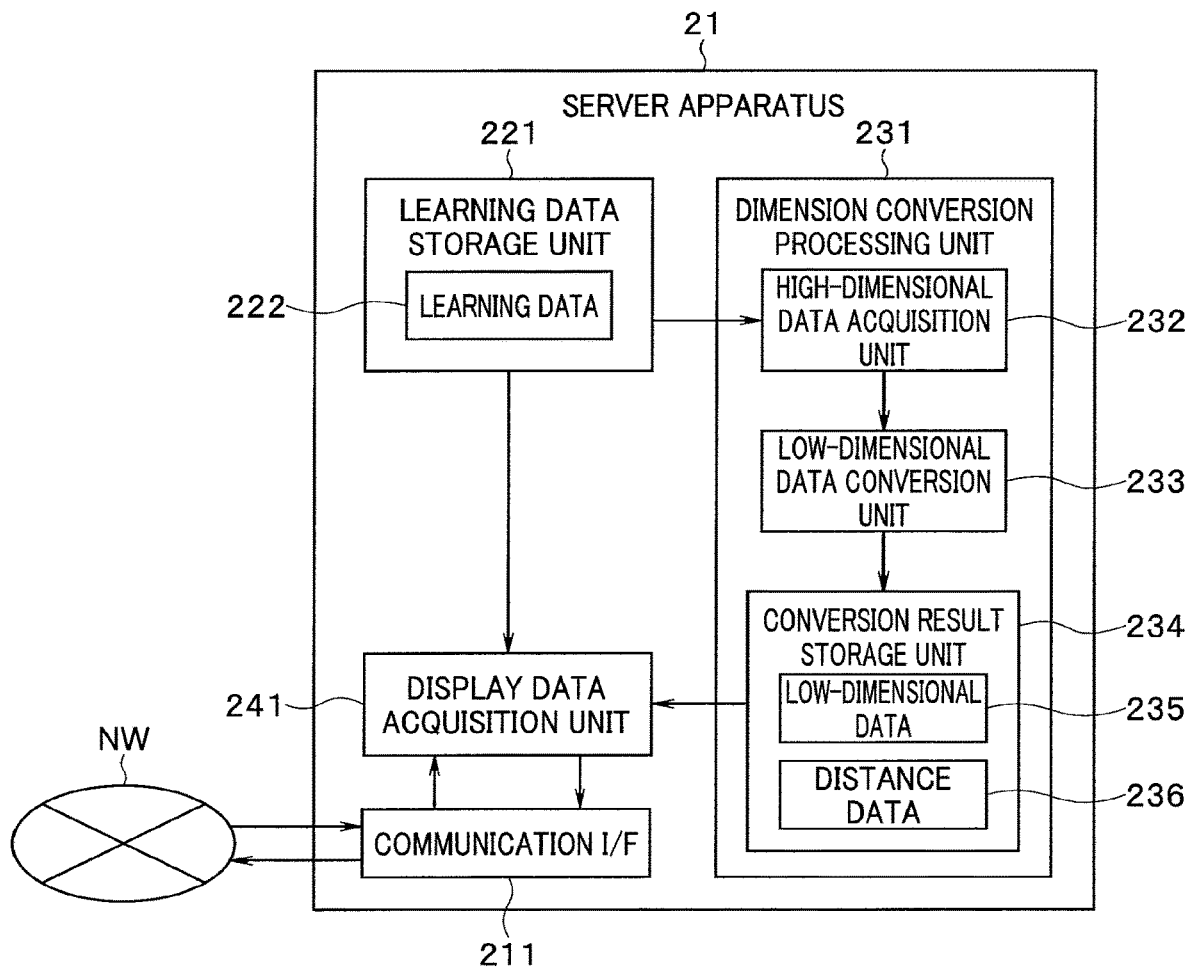
FIG. 3 is a diagram illustrating an example of a configuration of a server apparatus in the information display system according to the embodiment.

The server apparatus 21 is configured to include a communication I/F 211, a learning data storage unit 221, a dimension conversion processing unit 231, and a display data acquisition unit 241, as illustrated in FIG. 3. FIG. 3 is a diagram illustrating an example of a configuration of the server apparatus in the information display system according to the embodiment.

The communication I/F 211 is configured to include a communication circuit or the like that can be connected to the network NW, for example. The communication I/F 211 is configured to be able to perform wired or wireless communication with the communication I/F 111 in the information processing apparatus 11.

Figure 4:
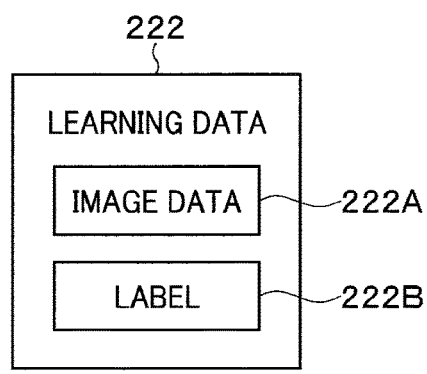
FIG. 4 is a diagram for describing learning data stored in the server apparatus.

The learning data storage unit 221 stores P (P≥2) learning data 222 each tagged with any one of ID numbers from the first ID number to the P-th ID number as learning data used for creating a machine learning model. Each of the P learning data 222 stored in the learning data storage unit 221 includes image data 222A obtained by performing image pickup of an object and a label 222B representing a result of classification of the image data 222A into one of a plurality of predetermined classes, as illustrated in FIG. 4, for example. FIG. 4 is a diagram for describing learning data stored in the server apparatus.

More specifically, when a machine learning model for performing classification related to a type of a damage occurring in a predetermined product, for example, P learning data 222 each including image data 222A obtained by performing image pickup of the predetermined product as an object and a label 222B representing a result of classification of the image data 222A into any one of three classes, a "linear damage", a "circular damage", and "no damage" are stored in the learning data storage unit 221.

Note that the classification result represented by the label 222B is determined by judgment of an operator who has visually confirmed the object included in the image data 222A. In other words, in such a case, the operator performs work for assigning a label corresponding to a judgment result obtained when an object included in one image data has been visually confirmed to the one image data.

The dimension conversion processing unit 231 is configured to include a high-dimensional data acquisition unit 232, a low-dimensional data conversion unit 233, and a conversion result storage unit 234.

The high-dimensional data acquisition unit 232 is configured to perform processing for acquiring high-dimensional data corresponding to the image data 222A for each of the P learning data 222 read from the learning data storage unit 221.

More specifically, the high-dimensional data acquisition unit 232 is configured to perform processing for acquiring a pixel value of each of pixels composing the image data 222A as high-dimensional data for each of the P learning data 222 read from the learning data storage unit 221, for example. Alternatively, the high-dimensional data acquisition unit 232 is configured to perform processing for acquiring a feature vector to be calculated based on a pixel value of each of pixels composing the image data 222A as high-dimensional data for each of the P learning data 222 read from the learning data storage unit 221, for example.

The high-dimensional data acquisition unit 232 is configured to output the P high-dimensional data obtained by the above-described processing, with which ID numbers and labels 222B are respectively associated, to the low-dimensional data conversion unit 233.

The low-dimensional data conversion unit 233 is configured to perform processing for converting each of the P high-dimensional data to be outputted from the high-dimensional data acquisition unit 232 into low-dimensional data.

More specifically, the low-dimensional data conversion unit 233 is configured to perform processing for converting, for the respective P high-dimensional data to be outputted from the high-dimensional data acquisition unit 232, each of pixel values acquired as one of the P high-dimensional data into two-dimensional data, for example. Alternatively, the low-dimensional data conversion unit 233 is configured to perform processing for converting, for the respective P high-dimensional data to be outputted from the high-dimensional data acquisition unit 232, a feature vector acquired as one of the P high-dimensional data into two-dimensional data, for example.

The low-dimensional data conversion unit 233 is configured to perform processing for calculating distances among the P low-dimensional data obtained by the above-described processing.

More specifically, the low-dimensional data conversion unit 233 is configured to perform processing for calculating a distance between plot points in a predetermined two-dimensional coordinate system in which P two-dimensional data obtained by the above-described processing have been plotted, for example.

The low-dimensional data conversion unit 233 is configured to output the P low-dimensional data obtained by the above-described processing, with which ID numbers and labels 222B are respectively associated, together with distance data respectively representing distances among the P low-dimensional data obtained by the above-described processing to the conversion result storage unit 234.

Note that according to the present embodiment, the distances calculated by the low-dimensional data conversion unit 233 are respectively represented as parameters corresponding to differences in likelihood among the P low-dimensional data. Accordingly, according to the present embodiment, the low-dimensional data conversion unit 233 may be configured to perform processing for calculating distances including likelihoods among the P low-dimensional data, for example. According to the present embodiment, the low-dimensional data conversion unit 233 may be configured to perform processing for calculating distances including degrees of similarity among the P low-dimensional data, for example.

The conversion result storage unit 234 stores data to be outputted from the low-dimensional data conversion unit 233. More specifically, the conversion result storage unit 234 stores P low-dimensional data 235, with which ID numbers and labels 222B are respectively associated, and stores distance data 236 respectively representing distances among the P low-dimensional data 235.

In other words, the dimension conversion processing unit 231 is configured to convert P high-dimensional data respectively obtained from P images tagged with labels 222B each representing a result of classification into one of a plurality of predetermined classes to respectively acquire P low-dimensional data.

The display data acquisition unit 241 is configured to detect an instruction received in the communication I/F 211 and acquire display data corresponding to the detected instruction from the learning data storage unit 221 and/or the conversion result storage unit 234. The display data acquisition unit 241 is configured to perform an operation for transmitting the display data acquired from the learning data storage unit 221 and/or the conversion result storage unit 234 to the information processing apparatus 11 from the communication I/F 211.

Note that in the present embodiment, the functions of at least some of the respective units included in the server apparatus 21 may be implemented by hardware including the processor 21A and the storage medium 21B. Alternatively, in the present embodiment, a program for implementing the functions of at least some of the respective units included in the server apparatus 21 is stored in the storage medium 21B and the processor 21A may read and execute the program. Examples of the computer readable storage medium 21B include an optical disk such as a CD-ROM, a phase change type optical disk such as a DVD-ROM, a magneto-optical disk such as an MO (magneto optical) or an MD (mini disk), a magnetic disk such as a floppy (registered trademark) disk or a removable hard disk, and a memory card such as a compact flash (registered trademark), a smart media, an SD memory card, or a memory stick. A hardware device such as an integrated circuit (an IC chip, etc.) configured by being specially designed for the purpose of the present embodiment is also included as a storage medium.

The present embodiment is not only implemented as a system for performing communication via the network NW but also may be implemented as a standalone apparatus having respective functions of the display processing unit 121, the control unit 131, the learning data storage unit 221, the dimension conversion processing unit 231, and the display data acquisition unit 241, for example.

Figure 5:
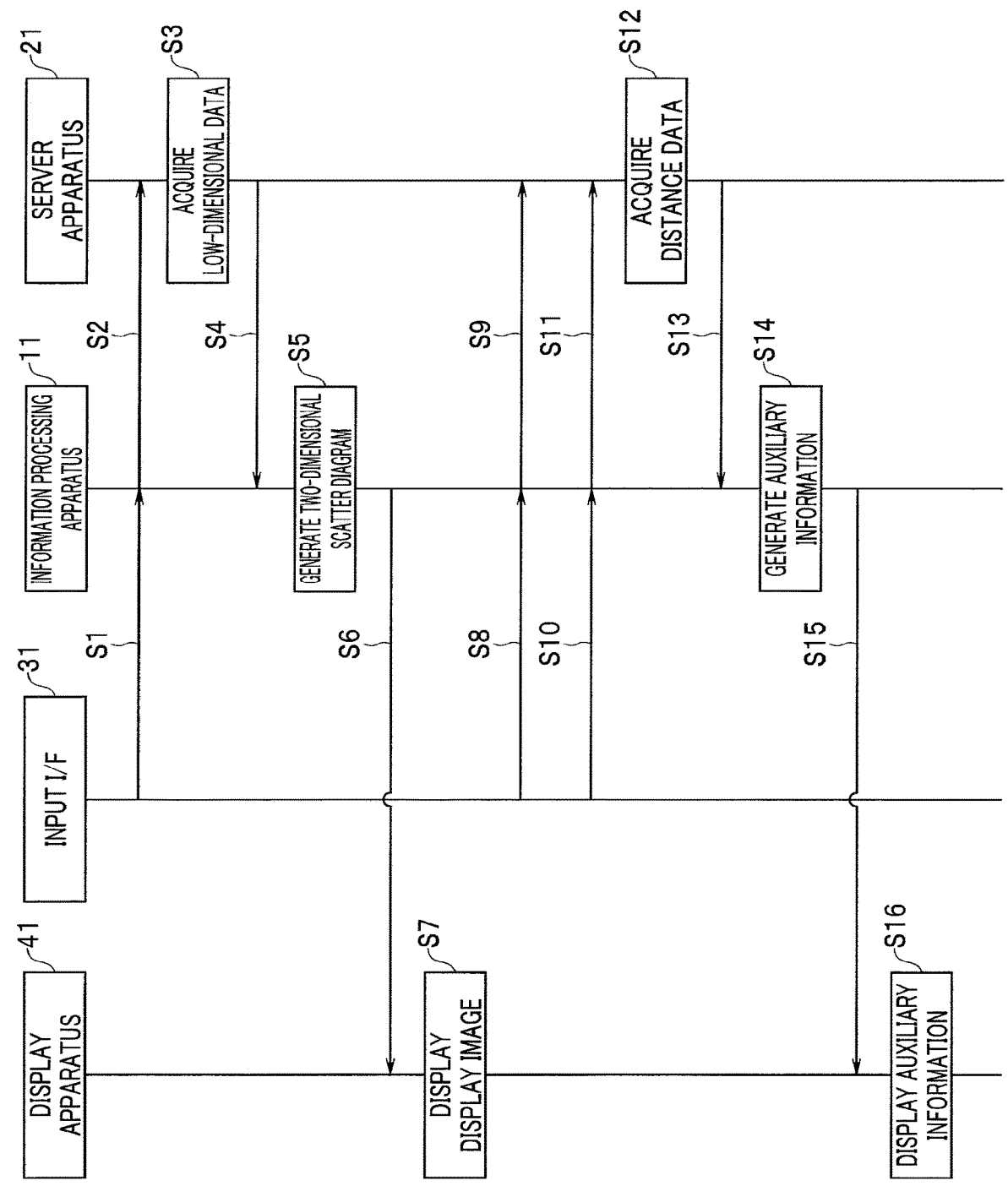
FIG. 5 is a sequence diagram for describing a specific example of processing or the like to be performed in the information display system according to the embodiment.

Then, operations of the present embodiment will be described with reference to FIG. 5, for example. FIG. 5 is a sequence diagram for describing a specific example of processing or the like to be performed in the information display system according to the embodiment.

Note that description is made below assuming that P learning data 222 each including image data 222A obtained by performing image pickup of an object and a label 222B representing a result of classification of the image data 222A into any one of three classes CK, CL, and CM and being each tagged with any one of ID numbers from the first ID number to the P-th number are stored in the learning data storage unit 221. Description is made below assuming that P two-dimensional data respectively corresponding to learning data 222 tagged with the first ID number to the P-th ID number are stored as P low-dimensional data 235 in the conversion result storage unit 234. Description is made below assuming that distance data 236 respectively representing distances among the P two-dimensional data are stored in the conversion result storage unit 234.

When the control unit 131 has detected that an instruction to display a two-dimensional scatter diagram on the display apparatus 41 (step S1 in FIG. 5) has been issued in the input I/F 31 with a predetermined application started, for example, the control unit 131 performs an operation for transmitting the detected instruction to the server apparatus 21 from the communication I/F 111 (step S2 in FIG. 5).

When the display data acquisition unit 241 has detected that the instruction transmitted in step S2 illustrated in FIG. 5 has been received in the communication I/F 211, the display data acquisition unit 241 performs an operation for acquiring P low-dimensional data 235 with which ID numbers and labels 222B are respectively associated as display data DFA from the conversion result storage unit 234 (step S3 in FIG. 5). The display data acquisition unit 241 performs an operation for transmitting the display data DFA acquired in step S3 illustrated in FIG. 5 to the information processing apparatus 11 from the communication I/F 211 (step S4 in FIG. 5).

The control unit 131 generates a two-dimensional scatter diagram using the display data DFA received in the communication I/F 111 after performing the operation in step S2 illustrated in FIG. 5 and subjects the display processing unit 121 to control to display a display image including the two-dimensional scatter diagram. Note that the display data DFA is held in a period elapsing until an instruction to finish a predetermined application (an application started in step S1 illustrated in FIG. 5) is detected by the control unit 131 immediately after being acquired by the control unit 131.

The display processing unit 121 performs processing for plotting each of the P low-dimensional data 235 included in the display data DFA obtained by the control unit 131 as a plot point (coordinate point) in a plane coordinate system and generating a two-dimensional scatter diagram corresponding to a plot diagram in which a color or a pattern that differs depending on a classification result represented by the label 222B included in the display data DFA is added to each of the plot points (step S5 in FIG. 5). The display processing unit 121 performs an operation for outputting a display image including the two-dimensional scatter diagram generated in step S5 illustrated in FIG. 5 to the display apparatus 41 (step S6 in FIG. 5).

In other words, the display processing unit 121 has a function as a plot diagram generation unit and is configured to generate a plot diagram including P plot points obtained by visualizing the P low-dimensional data included in the display data DFA each depending on the classification result represented by the label 222B included in the display data DFA.

The display apparatus 41 performs an operation for displaying a display image to be outputted from the information processing apparatus 11 on a screen through step S6 illustrated in FIG. 5 (step S7 in FIG. 5).

Figure 6A:
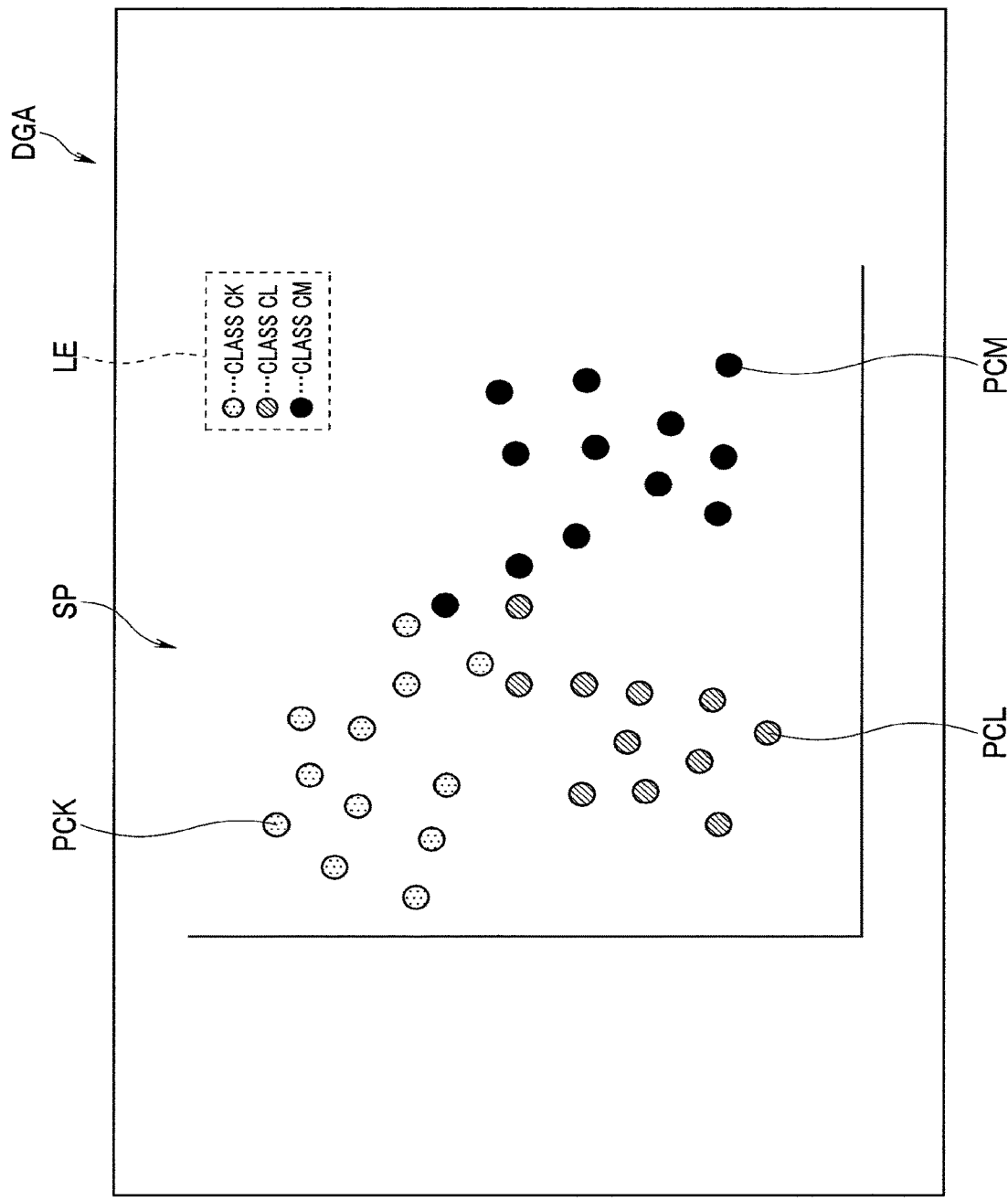
FIG. 6A is a diagram illustrating an example of a display image to be displayed depending on processing of the information display system according to the embodiment.

According to processes from step S1 to step S7 illustrated in FIG. 5, a display image DGA including a two-dimensional scatter diagram SP, as illustrated in FIG. 6A, for example, is displayed on the display apparatus 41. FIG. 6A is a diagram illustrating an example of a display image to be displayed depending on processing of the information display system according to the embodiment.

In the two-dimensional scatter diagram SP in the display image DGA illustrated in FIG. 6A, one or more plot points PCK corresponding to low-dimensional data 235 belonging to a class CK, one or more plot points PCL corresponding to low-dimensional data 235 belonging to a class CL, and one or more plot points PCM corresponding to low-dimensional data 235 belonging to a class CM are respectively plotted. Around the two-dimensional scatter diagram SP in the display image DGA illustrated in FIG. 6A, a legend LE for presenting differences among colors or patterns respectively added to the plot points PCK, the point points PCL, and the plot points PCM to the user is arranged.

Note that according to the present embodiment, when an operation for acquiring a display data DFC, described below, has been performed by the display data acquisition unit 241 and control to display a display image including a two-dimensional scatter diagram using the display data DFC has been performed by the control unit 131, for example, an operation for generating and outputting a display image DGQ as illustrated in FIG. 6B may be performed by the display processing unit 121. FIG. 6B is a diagram illustrating an example of a display image to be displayed depending on processing of the information display system according to the embodiment.

More specifically, the display processing unit 121 may perform an operation for specifying P coordinate points in a plane coordinate system respectively corresponding to P low-dimensional data 235 included in the display data DFC, respectively arranging thumbnails of P image data 222A obtained from learning data 222 included in the display data DFC for the specified P coordinate points to generate a two-dimensional scatter diagram SQ, and outputting the display image DGQ including the generated two-dimensional scatter diagram SQ to the display apparatus 41, for example, in response to control by the control unit 131.

The two-dimensional scatter diagram SQ is generated as substantially the same diagram as a diagram in which the plot points included in the two-dimensional scatter diagram SP are respectively replaced with the thumbnails of the image data 222A. Accordingly, according to the present embodiment, desired one of the thumbnails included in the two-dimensional scatter diagram SQ can be set as a thumbnail corresponding to a base point, described below. According to the present embodiment, a display image obtained by adding any one of auxiliary information, described below, to the two-dimensional scatter diagram SQ can also be displayed.

When the control unit 131 has detected that an instruction to set as a base point desired one of the respective plot points included in the two-dimensional scatter diagram displayed on the display apparatus 41 through step S7 illustrated in FIG. 5 (step S8 illustrated in FIG. 5) has been issued in the input I/F 31, the control unit 131 performs processing for specifying an ID number of the low-dimensional data 235 corresponding to the desired one plot point from the display data DFA. The control unit 131 performs an operation for transmitting an instruction to set the low-dimensional data 235 tagged with the ID number specified as described above as a base point to the server apparatus 21 from the communication I/F 111 (step S9 in FIG. 5).

When the control unit 131 has detected that an instruction to set the number N ($1 \leq N < P$) of reference points respectively corresponding to the plot points used for judging whether or not a class to which the base point set by the instruction in step S8 illustrated in FIG. 5 belongs is correct (step S10 in FIG. 5) has been issued in the input I/F 31, the control unit 131 performs an operation for transmitting the detected instruction to the server apparatus 21 from the communication I/F 111 (step S11 in FIG. 5).

Note that in the present embodiment, an initial value of the number N of reference points to be presented to the user before the instruction in step S10 illustrated in FIG. 5 is issued may be a previously set fixed value, or may be a variable value to be set as a ratio to the total number of low-dimensional data 235 included in the display data DFA.

When the display data acquisition unit 241 has detected that the instruction transmitted in step S9 illustrated in FIG. 5 has been received in the communication I/F 211, the display data acquisition unit 241 performs processing for specifying low-dimensional data 235C corresponding to an ID number included in the instruction from among the P low-dimensional data 235 stored in the conversion result storage unit 234. When the display data acquisition unit 241 has detected that the instruction transmitted in step S11 illustrated in FIG. 5 has been received in the communication I/F 211, the display data acquisition unit 241 performs processing for acquiring distance data 236C corresponding to the low-dimensional data 235C and the number N of reference points included in the instruction from among the distance data 236 stored in the conversion result storage unit 234 (step S12 in FIG. 5).

Figure 7:
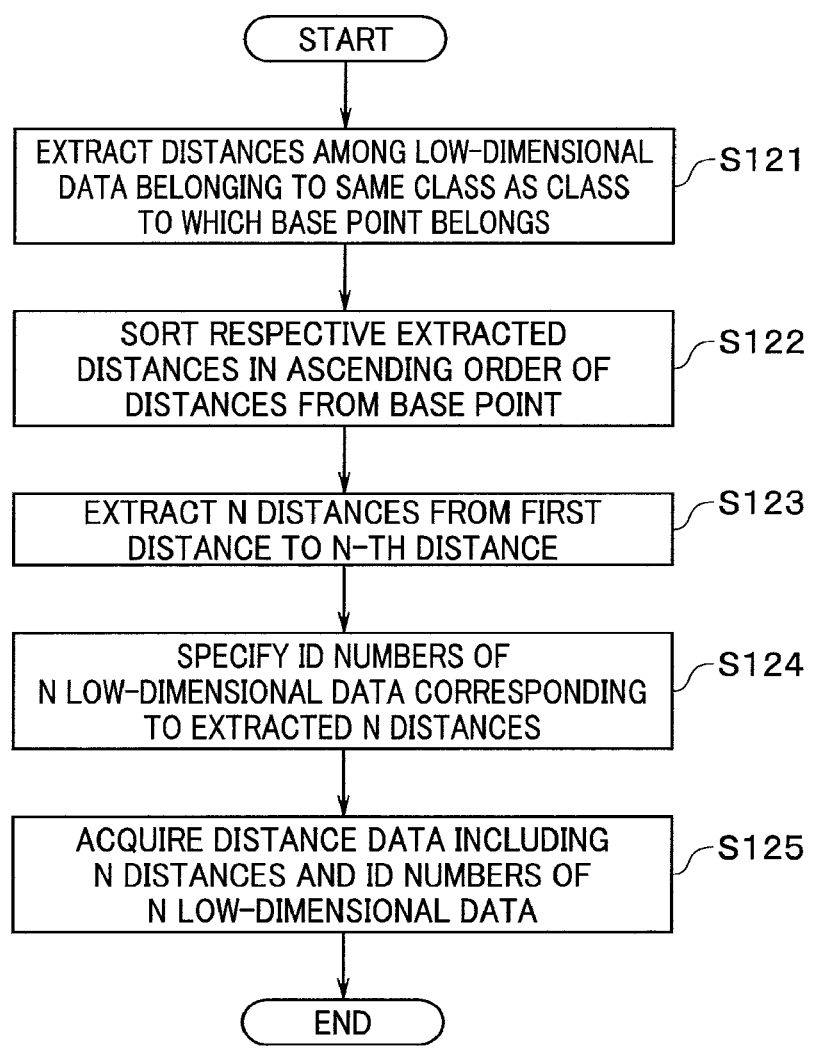
FIG. 7 is a flowchart for describing a specific example of processing to be performed in the information display system according to the embodiment.

A specific example of processing to be performed in step S12 illustrated in FIG. 5 will be described with reference to FIG. 7. FIG. 7 is a flowchart for describing a specific example of processing to be performed in the information display system according to the embodiment.

The display data acquisition unit 241 extracts distances among low-dimensional data belonging to the same class as a class to which low-dimensional data 235C belongs from among distance data 236 stored in the conversion result storage unit 234 (step S121 in FIG. 7).

The display data acquisition unit 241 sorts the respective distances extracted in step S121 illustrated in FIG. 7 in ascending order of distances from the low-dimensional data 235C corresponding to a base point (step S121 in FIG. 7). Note that in the processing in step S122 illustrated in FIG. 7, distances different from the distances from the low-dimensional data 235C are excluded from a sorting target.

The display data acquisition unit 241 extracts, among the respective distances sorted in step S122 illustrated in FIG. 7, the N distances from the first distance to the N-th distance (step S123 in FIG. 7).

The display data acquisition unit 241 specifies, from among respective ID numbers of P low-dimensional data 235 stored in the conversion result storage unit 234, ID numbers of N low-dimensional data respectively corresponding to the N distances extracted in step S123 illustrated in FIG. 7 (step S124 in FIG. 7).

The display data acquisition unit 241 acquires distance data 236C including the N distances extracted in step S123 illustrated in FIG. 7 and the respective ID numbers of the N low-dimensional data specified in step S124 illustrated in FIG. 7 (step S125 in FIG. 7).

In other words, according to a specific example as described above, when the number N of reference points is set to three, for example, distance data 236C including a distance L1 to low-dimensional data 235C1 closest to the low-dimensional data 235C, a ID number of the low-dimensional data 235C1 corresponding to the distance L1, a distance L2 to low-dimensional data 235C2 second closest to the low-dimensional data 235C, a ID number of the low-dimensional data 235C2 corresponding to the distance L2, a distance L3 to low-dimensional data 235C3 third closest to the low-dimensional data 235C, and an ID number of the low-dimensional data 235C3 corresponding to the distance L3 is acquired.

The display data acquisition unit 241 performs an operation for transmitting display data DFB including the distance data 236C acquired in step S12 illustrated in FIG. 5 to the information processing apparatus 11 from the communication I/F 211 (step S13 in FIG. 5).

The control unit 131 subjects the display processing unit 121 to control to generate auxiliary information corresponding to the base point set by the instruction in step S8 illustrated in FIG. 5 and the display data DFB received in the communication I/F 111 after performing the respective operations in step S9 and step S11 illustrated in FIG. 5 and to display a display image obtained by adding the auxiliary information to a two-dimensional scatter diagram. Note that the display data DFB is held in a period elapsing until the control unit 131 detects an instruction to set a new base point different from the base point corresponding to the instruction in step S8 illustrated in FIG. 5 immediately after being acquired by the control unit 131, for example. Alternatively, the display data DFB is held in a period elapsing until the control unit 131 detects an instruction to set a new number of reference points different from the number of reference points corresponding to the instruction in step S10 illustrated in FIG. 5 immediately after being acquired by the control unit 131, for example.

The display processing unit 121 performs an operation for performing processing for generating auxiliary information corresponding to the control by the control unit 131 (step S14 illustrated in FIG. 5) and performs an operation for outputting a display image obtained by adding the auxiliary information to the two-dimensional scatter diagram generated by the processing in step S5 illustrated in FIG. 5 to the display apparatus 41 (step S15 illustrated in FIG. 5).

The display apparatus 41 performs an operation for displaying on a screen the display image to be outputted from the information processing apparatus 11 through step S15 illustrated in FIG. 5, i.e., the display image including the auxiliary information generated in step S14 illustrated in FIG. 5 (step S16 in FIG. 5).

Figure 8:
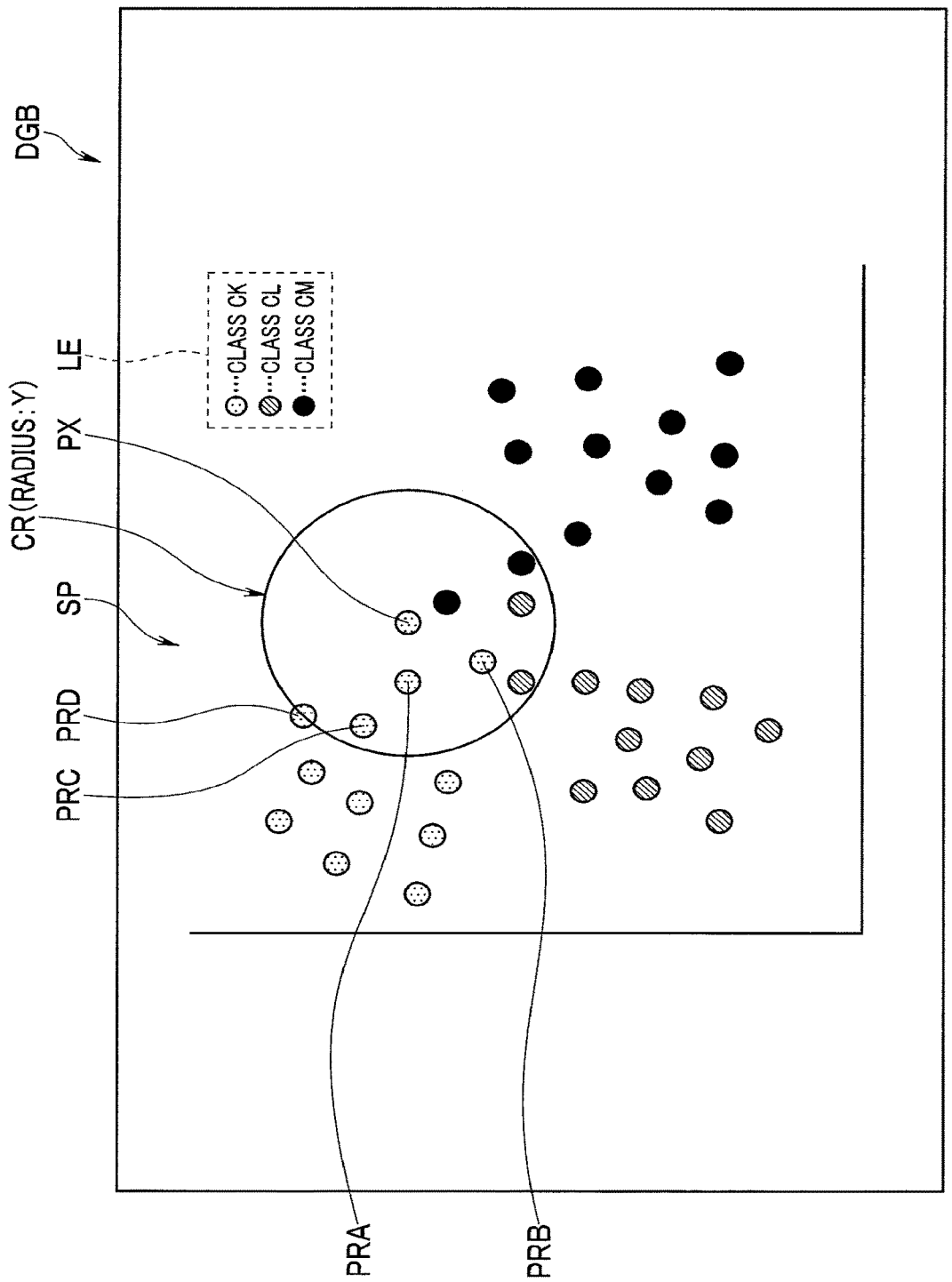
FIG. 8 is a diagram illustrating an example of a display image to be displayed depending on processing of the information display system according to the embodiment.
Figure 9:
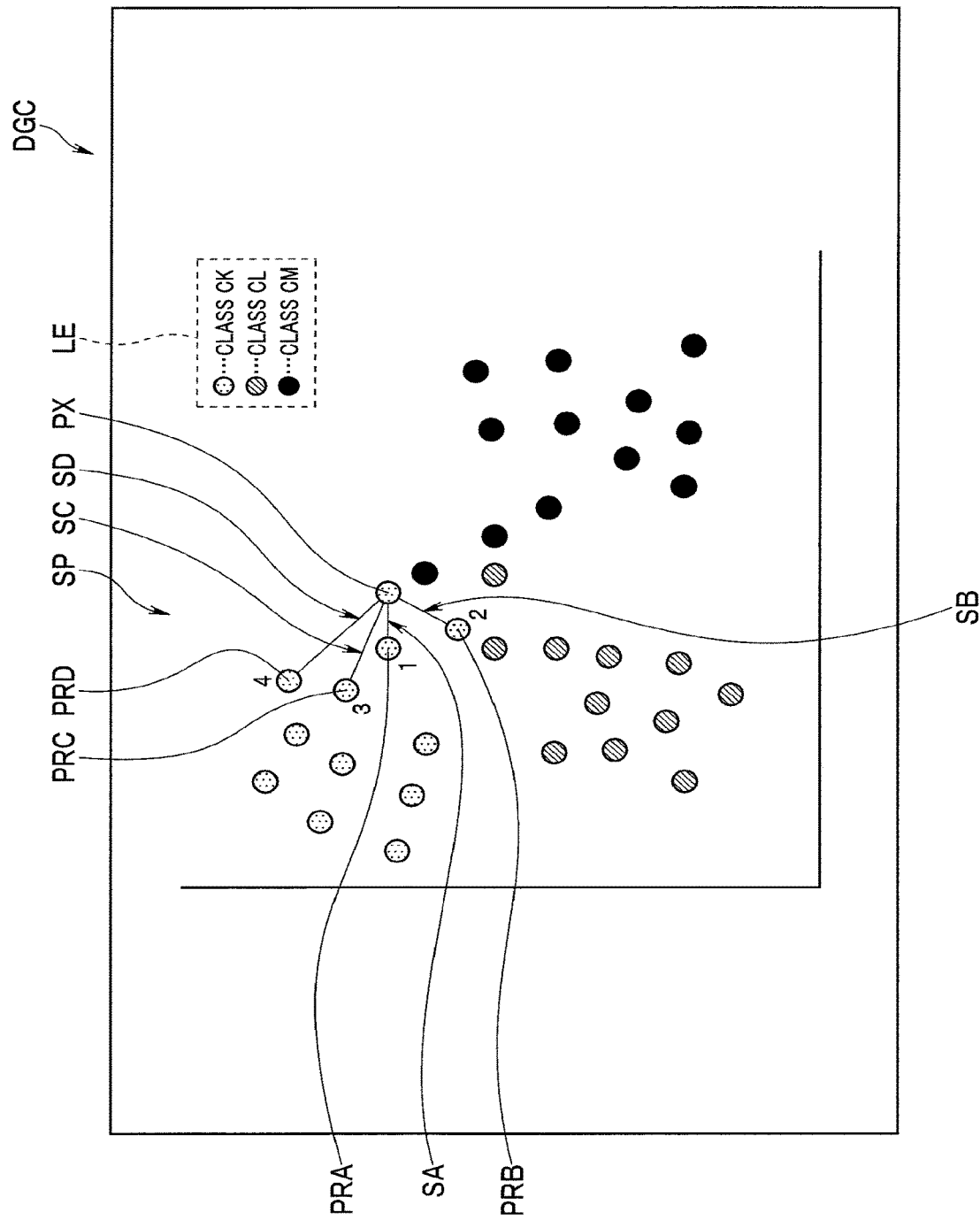
FIG. 9 is a diagram illustrating an example of a display image to be displayed depending on processing of the information display system according to the embodiment.
Figure 10:
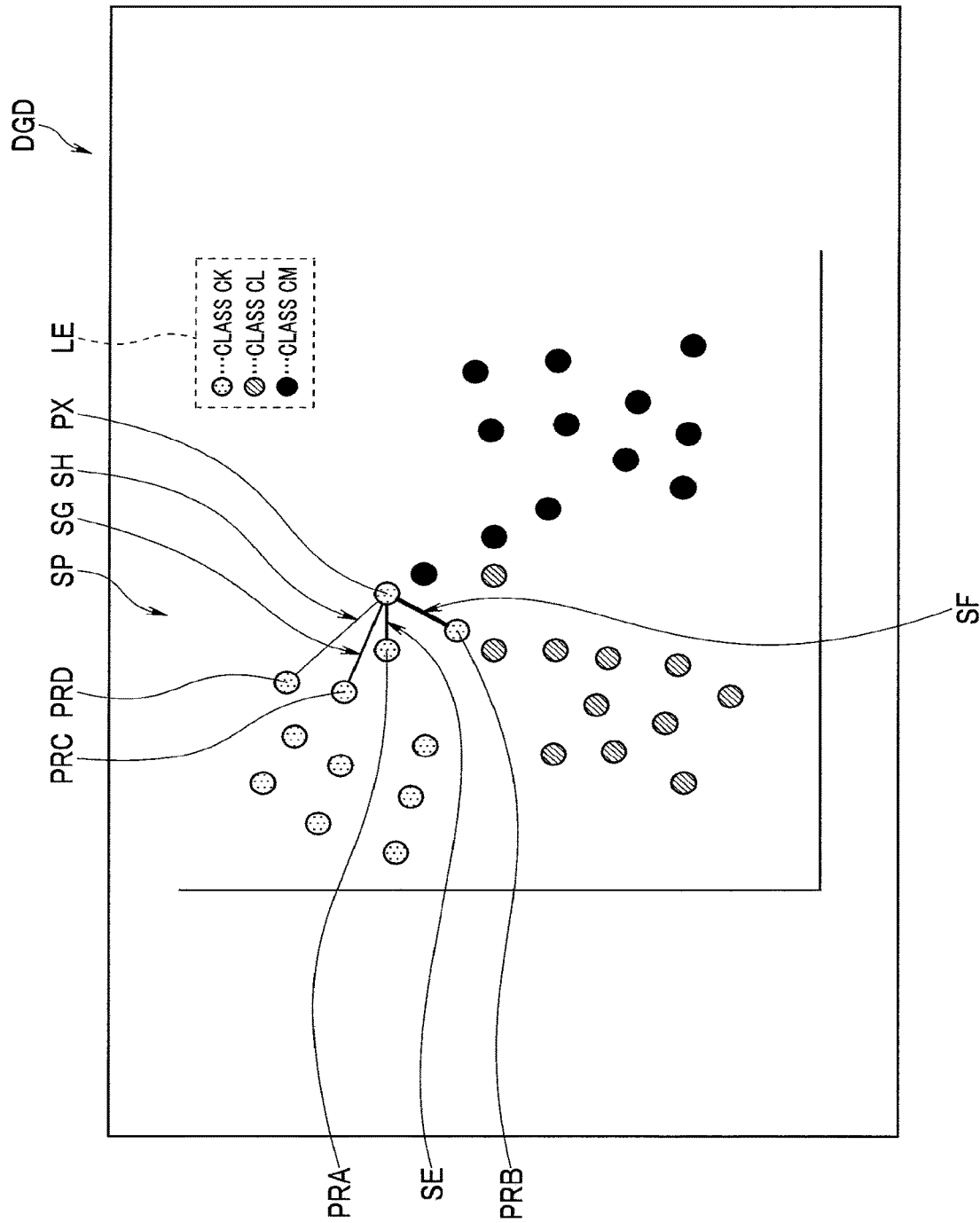
FIG. 10 is a diagram illustrating an example of a display image to be displayed depending on processing of the information display system according to the embodiment.

When processes in step S8 to step S16 illustrated in FIG. 5, for example, have been performed with the display image DGA illustrated in FIG. 6A displayed, any one of a display image DGB as illustrated in FIG. 8, a display image DGC as illustrated in FIG. 9, and a display image DGD as illustrated in FIG. 10, for example, is displayed on the display apparatus 41. Note that description is made below assuming that a plot point PX belonging to a class CK is set as a base point and the number N of reference points is set to four, unless otherwise noted. FIGS. 8 to 10 are diagrams each illustrating an example of a display image to be displayed depending on processing of the information display system according to the embodiment.

To a two-dimensional scatter diagram SP in the display image DGB illustrated in FIG. 8, a circle CR having a plot point PX as a central point and passing through a plot point PRD corresponding to one of four reference points is added as auxiliary information. In other words, auxiliary information added to the two-dimensional scatter diagram SP in the display image DGB illustrated in FIG. 8 includes a circle having a base point corresponding to the plot point PX as a central point and having as a radius a distance between the base point and the one reference point corresponding to the plot point PRD farthest from the plot point PX among the four reference points.

Accordingly, the user can judge, by confirming the number of plot points within a range of the circle CR and a class to which each of the plot points within the range of the circle CR belongs, whether or not the class to which the plot point PX belongs is correct, i.e., whether or not a classification result represented by a label 222B associated with low-dimensional data 225 corresponding to the plot point PX needs to be corrected, for example. Note that in the present embodiment, the plot point positioned on the circumference of the circle CR and the plot point positioned inside the circumference of the circle CR are respectively treated as the plot points within the range of the circle CR for convenience of illustration and description.

According to a display example illustrated in FIG. 8, the display processing unit 121 performs processing for setting the plot point PX as the base point from among the respective plot points included in the two-dimensional scatter diagram SP as the processing in step S14 illustrated in FIG. 5. According to the display example illustrated in FIG. 8, the display processing unit 121 performs processing for respectively setting plot points PRA, PRB, PRC, and PRD corresponding to low-dimensional data 235 with four ID numbers in distance data 236 included in display data DFB as four reference points from among the respective plot points included in the two-dimensional scatter diagram SP as the processing in step S14 illustrated in FIG. 5. According to the display example illustrated in FIG. 8, the display processing unit 121 performs processing for specifying the plot point PRD farthest from the plot point PX from among the plot points respectively corresponding to the four reference points based on the distance data 236 included in the display data DFB as the processing in step S14 illustrated in FIG. 5. According to the display example illustrated in FIG. 8, the display processing unit 121 performs processing for generating as auxiliary information the circle CR having the plot point PX as a central point and having as a radius a distance Y between the plot point PX and the plot point PRD as the processing in step S14 illustrated in FIG. 5.

To a two-dimensional scatter diagram SP in the display image DGC illustrated in FIG. 9, four line segments SA, SB, SC, and SD respectively connecting a plot point PX and plot points PRA, PRB, PRC, and PRD respectively corresponding to four reference points to each other are added as auxiliary information. To respective vicinities of the four plot points PRA, PRB, PRC, and PRD in the two-dimensional scatter diagram SP illustrated in FIG. 9, "1", "2", "3", and "4" respectively corresponding to numbers representing proximities to the plot point PX are added as auxiliary information. In other words, the auxiliary information added to the two-dimensional scatter diagram SP in the display image DGC illustrated in FIG. 9 includes four line segments respectively connecting a base point corresponding to the plot point PX and the four reference points to each other and numbers respectively representing proximities of the four reference points to the base point.

Accordingly, the user can judge whether or not a class to which the plot point PX belongs is correct, i.e., whether or not a classification result represented by a label 222B associated with low-dimensional data 225 corresponding to the plot point PX needs to be corrected by confirming respective lengths of the four line segments SA, SB, SC, and SD and respective numbers displayed in vicinities of the four plot points RPA, PRB, PRC, and PRD, for example.

According to a display example illustrated in FIG. 9, the display processing unit 121 performs processing for setting the plot point PX as a base point from among the respective plot points included in the two-dimensional scatter diagram SP as the processing in step S14 illustrated in FIG. 5. According to the display example illustrated in FIG. 9, the display processing unit 121 performs processing for respectively setting the plot points PRA, PRB, PRC, and PRD corresponding to low-dimensional data 235 with four ID numbers in distance data 236 included in display data DFB as four reference points from among the respective plot points included in the two-dimensional scatter diagram SP as the processing in step S14 illustrated in FIG. 5. According to the display example illustrated in FIG. 9, the display processing unit 121 performs processing for specifying that the plot points PRA, PRB, PRC, and PRD corresponding to the four reference points in the two-dimensional scatter diagram SP are positioned in ascending order of distances to the plot point PX based on the distance data 236 included in the display data DFB as the processing in step S14 illustrated in FIG. 5. According to the display example illustrated in FIG. 9, the display processing unit 121 performs processing for generating as auxiliary information the line segment SA connecting the plot point PX and the plot point PRA to each other, the line segment SB connecting the plot point PX and the plot point PRB to each other, the line segment SC connecting the plot point PX and the plot point PRC to each other, and the line segment SD connecting the plot point PX and the plot point PRD to each other as the processing in step S14 illustrated in FIG. 5. According to the display example illustrated in FIG. 9, the display processing unit 121 performs processing for generating as auxiliary information the number "1" indicating that the plot point PRA is closest to the plot point PX, the number "2" indicating that the plot point PRB is second closest to the plot point PX, the number "3" indicating that the plot point PRC is third closest to the plot point PX, and the number "4" indicating that the plot point PRD is fourth closest to the plot point PX as the processing in step S14 illustrated in FIG. 5.

To a two-dimensional scatter diagram SP in the display image DGD illustrated in FIG. 10, four line segments SE, SF, SG, and SH respectively connecting a plot point PX and plot points PRA, PRB, PRC, and PRD respectively corresponding to four reference points to each other are added as auxiliary information. The four line segments SE, SF, SG, and SH added to the two-dimensional scatter diagram SP illustrated in FIG. 10 respectively have line widths corresponding to proximities to the plot point PX. In other words, the auxiliary information added to the two-dimensional scatter diagram SP in the display image DGD illustrated in FIG. 10 includes four line segments respectively connecting a base point corresponding to the plot point PX and the four reference points to each other and respectively having line widths or dark hues corresponding to proximities of the four reference points to the base point.

Accordingly, the user can judge whether or not a class to which the plot point PX belongs is correct, i.e., whether or not a classification result represented by a label 222B associated with low-dimensional data 225 corresponding to the plot point PX needs to be corrected by confirming respective lengths and thicknesses of the four line segments SE, SF, SG, and SH, for example.

According to a display example illustrated in FIG. 10, the display processing unit 121 performs processing for specifying the plot point PX as a base point from among the respective plot points included in the two-dimensional scatter diagram SP as the processing in step S14 illustrated in FIG. 5. According to the display example illustrated in FIG. 10, the display processing unit 121 performs processing for setting the plot points PRA, PRB, PRC, and PRD respectively corresponding to low-dimensional data 235 with four ID numbers in distance data 236 included in display data DFB as four reference points from among the respective plot points included in the two-dimensional scatter diagram SP as the processing in step S14 illustrated in FIG. 5. According to the display example illustrated in FIG. 10, the display processing unit 121 performs processing for specifying that the plot points PRA, PRB, PRC, and PRD respectively corresponding to the four reference points in the two-dimensional scatter diagram SP are positioned in ascending order of distances to the plot point PX based on the distance data 236 included in the display data DFB as the processing in step S14 illustrated in FIG. 5. According to the display example illustrated in FIG. 10, the display processing unit 121 performs processing for generating as auxiliary information the line segment SE connecting the plot point PX and the plot point PRA to each other, the line segment SF connecting the plot point PX and the plot point PRB to each other, the line segment SG connecting the plot point PX and the plot point PRC to each other, and the line segment SH connecting the plot point PX and the plot point PRD to each other as the processing in step S14 illustrated in FIG. 10. According to the display example illustrated in FIG. 10, the display processing unit 121 performs processing for setting the line width of the line segment SE to WE, setting the line width of the line segment SF to WF (<WE), setting the line width of the line segment SG to WG (<WF), and setting the line width of the line segment SH to WH (<WG) as the processing in step S14 illustrated in FIG. 5.

Note that in the display example illustrated in FIG. 10, not only processing for respectively increasing the line widths of the four line segments SE, SF, SG, and SH depending on the proximities to the plot point PX but also processing for respectively increasing the dark hues of the four line segments depending on the proximities to the plot point PX may be performed.

In other words, the display processing unit 121 has a function as an auxiliary information generation unit, and is configured to generate auxiliary information corresponding to a base point set as the plot point PX among the respective plot points included in the two-dimensional scatter diagram SP and N reference points respectively set as plot points corresponding to the N low-dimensional data extracted in ascending order of differences from the one low-dimensional data used in visualizing the plot point PX from among the low-dimensional data, belonging to the same class as a class to which the base point belongs, among the P low-dimensional data. The display processing unit 121 has a function as a display image generation unit, and is configured to generate a display image including the two-dimensional scatter diagram SP to which the auxiliary information generated as described above is added.

The configuration according to the present embodiment may be modified, as needed, so that a plot diagram in which one-dimensional data is plotted as a plot point (coordinate point) on a straight line is displayed on the display apparatus 41 and auxiliary information corresponding to the base point set by the instruction issued in the input I/F 31 and the number of reference points is added to the plot diagram, for example.

The configuration according to the present embodiment may be modified, as needed, so that a plot diagram in which three-dimensional data is plotted as a plot point (coordinate point) in a spatial coordinate system is displayed on the display apparatus 41 and auxiliary information corresponding to the base point set by the instruction issued in the input I/F 31 and the number of reference points is added to the plot diagram, for example.

The configuration according to the present embodiment may be modified, as needed, so that a plot diagram different from the two-dimensional scatter diagram is displayed on the display apparatus 41 and auxiliary information corresponding to the base point set by the instruction issued in the input I/F 31 and the number of reference points is added to the plot diagram, for example.

As described above, according to the present embodiment, a display image obtained by adding auxiliary information corresponding to the base point set by the user and the number of reference points to the plot diagram such as the two-dimensional scatter diagram in which P two-dimensional data are plotted as plot points (coordinate points) in a plane coordinate system can be displayed. Accordingly, according to the present embodiment, the user can judge whether or not the classification result represented by the label associated with the low-dimensional data corresponding to the base point set in the plot diagram needs to be corrected based on the auxiliary information added to the plot diagram such as the two-dimensional scatter diagram. Therefore, according to the present embodiment, work related to correction of a label tagged to learning data used for creating a machine learning model can be made efficient.

According to the present embodiment, when the circle CR illustrated in FIG. 8 is added as the auxiliary information to the two-dimensional scatter diagram SP, for example, the display processing unit 121 may perform processing for displaying information representing a ratio RA (=NA1/NA2) of the number NA1 of plot points belonging to the same class as the class to which the plot point PX belongs within the range of the circle CR to the total number NA2 of plot points within the range of the circle CR, together with the two-dimensional scatter diagram SP, on the display apparatus 41.

Figure 11:
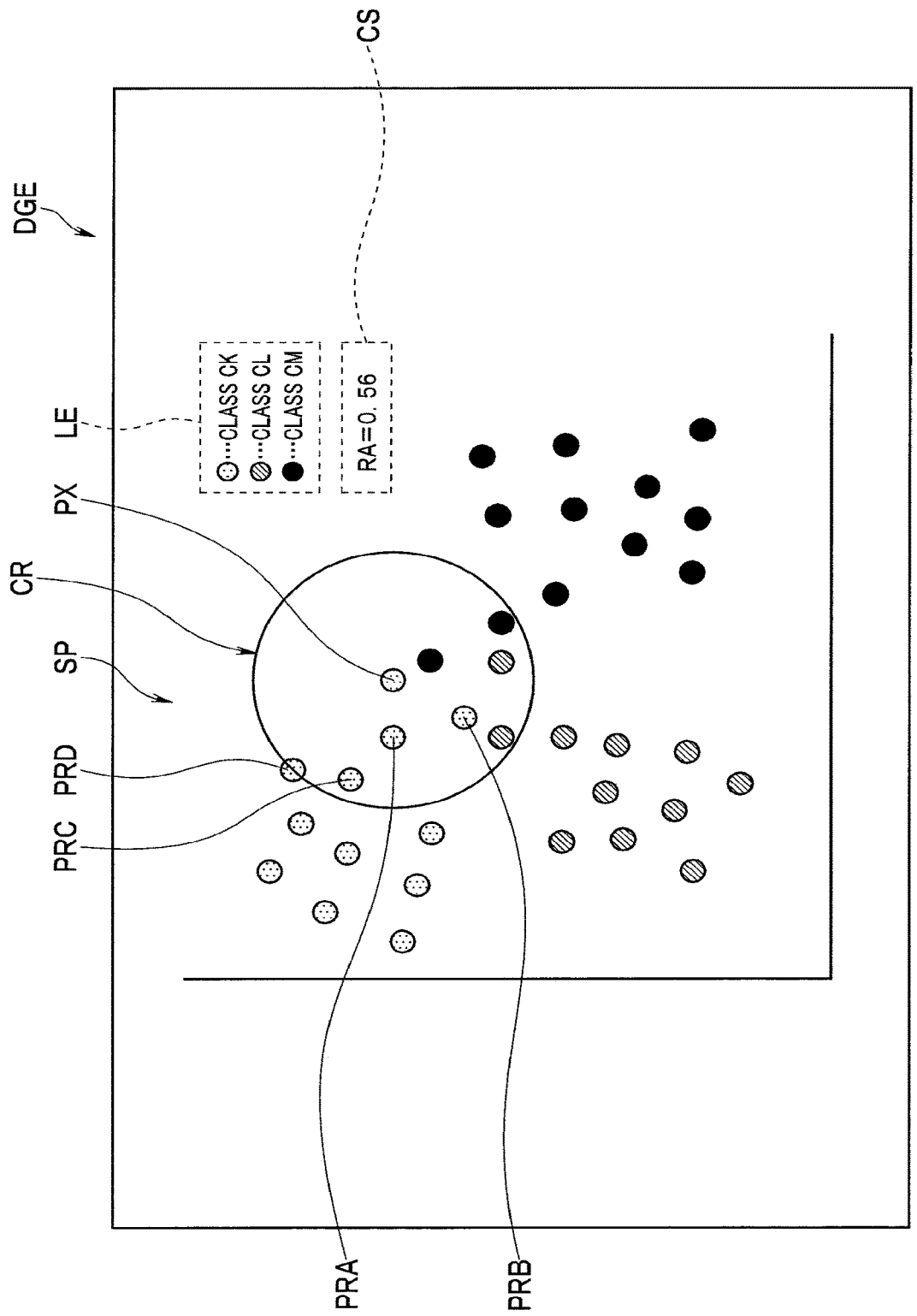
FIG. 11 is a diagram illustrating an example of a display image to be displayed depending on processing of the information display system according to the embodiment.

According to the above-described processing, a display image DGE corresponding to an image obtained by adding a character string CS for presenting the above-described ratio RA to the user to the display image DGB, as illustrated in FIG. 11, for example, is displayed on the display apparatus 41. In other words, the display image DGE includes information representing a ratio of the number of plot points belonging to the same class as a class to which a base point belongs within the range of the circle CR to the total number of plot points within the range of the circle CR. FIG. 11 is a diagram illustrating an example of a display image to be displayed depending on processing of the information display system according to the embodiment.

According to the present embodiment, when the circle CR illustrated in FIG. 8 is added as the auxiliary information to the two-dimensional scatter diagram SP, for example, the display processing unit 121 may perform processing for displaying information representing the number of plot points for each class to which each of the plot points belongs within the range of the circle CR and information representing a ratio RB NA3/NA4) of the number NA3 of plot points belonging to the one class within the range of the circle CR to the total number NA4 of plot points within the range of the circle CR, together with the two-dimensional scatter diagram SP, on the display apparatus 41.

Figure 12:
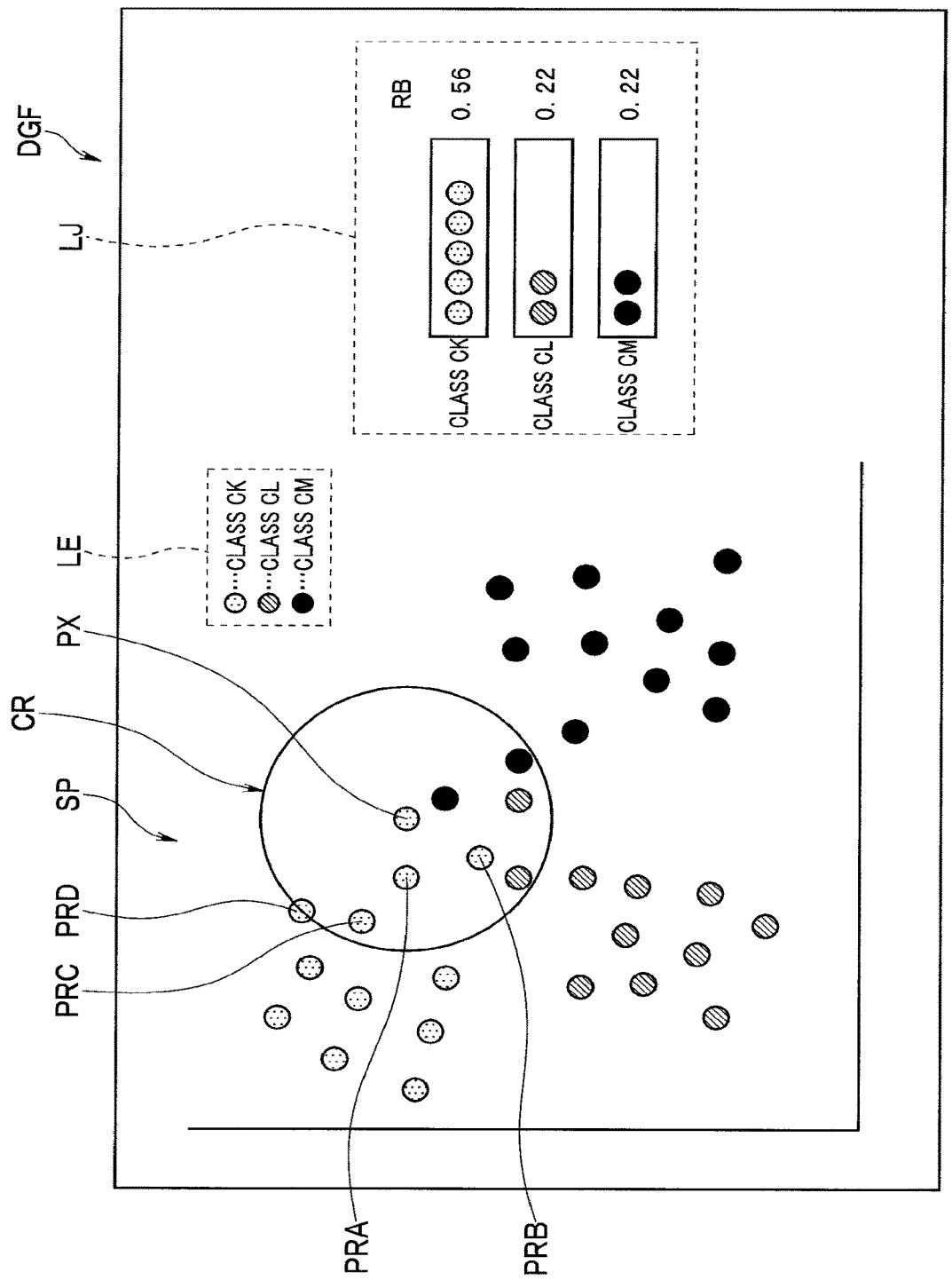
FIG. 12 is a diagram illustrating an example of a display image to be displayed depending on processing of the information display system according to the embodiment.

According to the above-described processing, a display image DGF corresponding to an image obtained by adding list information LJ to the display image DGB is displayed on the display apparatus 41, as illustrated in FIG. 12, for example. FIG. 12 is a diagram illustrating an example of a display image to be displayed depending on processing of the information display system according to the embodiment.

The list information LJ in the display image DGF illustrated in FIG. 12 includes information representing the number of (five) plot points belonging to a class CK among respective plot points (nine points) within a range of a circle CR, information representing the number of (two) plot points belonging to a class CL among the respective plot points, and information representing the number of (two) plot points belonging to a class CM among the respective plot points. In other words, the display image DGF includes information about a result of classification of the plot points within the range of the circle CR for the class to which each of the plot points belongs. The list information LJ in the display image DGF illustrated in FIG. 12 includes a character string (0.56) for presenting a ratio of the number of plot points belonging to the class CK within the range of the circle CR to the total number of plot points within the range of the circle CR to the user. The list information LJ in the display image DGF illustrated in FIG. 12 includes a character string (0.22) for presenting a ratio of the number of plot points belonging to the class CL within the range of the circle CR to the total number of plot points within the range of the circle CR to the user. The list information LJ in the display image DGF illustrated in FIG. 12 includes a character string (0.22) for presenting a ratio of the number of plot points belonging to the class CM within the range of the circle CR to the total number of plot points within the range of the circle CR to the user.

Accordingly, the user can judge whether or not a class to which a plot point PX belongs is correct and judge whether or not classes to which one or more desired plot points other than the plot point PX within the range of the circle CR respectively belong are correct by referring to each of the information included in the list information LJ, for example.

Figure 13:
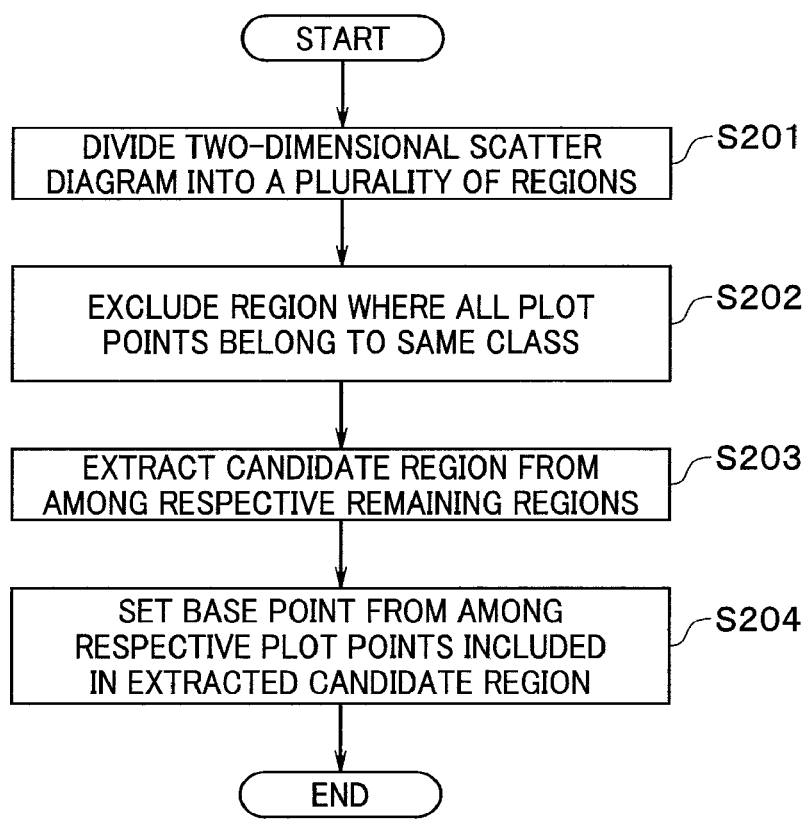
FIG. 13 is a flowchart for describing a specific example of processing to be performed in the information display system according to the embodiment.

According to the present embodiment, the control unit 131 may perform processing for setting the base point using the two-dimensional scatter diagram generated by the display processing unit 121, for example. A specific example of such processing will be described with reference to FIG. 13. FIG. 13 is a flowchart for describing a specific example of processing to be performed in the information display system according to the embodiment.

The control unit 131 performs processing for acquiring the two-dimensional scatter diagram generated in step S5 illustrated in FIG. 5 from the display processing unit 121 and dividing the acquired two-dimensional scatter diagram into a plurality of regions (step S201 in FIG. 13).

The control unit 131 performs processing for excluding the region where all plot points belong to the same class from among the respective regions obtained by the processing in step S201 illustrated in FIG. 13 (step S202 in FIG. 13).

The control unit 131 performs processing for extracting a candidate region to be a base point selection target from among the respective regions remaining through the processing in step S202 illustrated in FIG. 13 (step S203 in FIG. 13).

More specifically, the control unit 131 extracts, from among the respective regions remaining through the processing in step S202 illustrated in FIG. 13, the region where classes to which the plot points respectively belong are of the largest number of types as a candidate region, for example. Note that when such a method is used, one or more of the respective regions remaining through the processing in step S202 illustrated in FIG. 13 are respectively extracted as candidate regions.

Alternatively, the control unit 131 extracts, from among the respective regions remaining through the processing in step S202 illustrated in FIG. 13, the region where an identification boundary between classes to which the plot points respectively belong is most complex as a candidate region, for example. Note that the complexity of the above-described identification boundary can be evaluated by the number of inflection points on a line segment representing the identification boundary, for example.

Alternatively, the control unit 131 extracts, from among the respective regions remaining through the processing in step S202 illustrated in FIG. 13, the region where predetermined statistics such as an average value and a variance calculated using low-dimensional data respectively corresponding to the plot points respectively exceed predetermined values.

The control unit 131 performs processing for setting, from among the respective plot points included in the candidate region extracted by the processing in step S203 illustrated in FIG. 13, the one plot point corresponding to a base point (step S204 in FIG. 13).

More specifically, the control unit 131 sets, from among the respective plot points included in the candidate region extracted by the processing in step S203 illustrated in FIG. 13, the one plot point randomly selected as a base point, for example.

In other words, according to a series of processes illustrated in FIG. 13, the base point in the two-dimensional scatter diagram generated by the display processing unit 121 is set as a plot point selected from either a region where classes to which the plot points respectively belong are of the largest number of types or a region where the identification boundary between the classes to which the plot points respectively belong is most complex among the plurality of regions obtained by dividing the two-dimensional scatter diagram.

The control unit 131 can perform a similar operation to the operation in step S9 illustrated in FIG. 5 by specifying the ID number of the low-dimensional data 235 corresponding to the base point set through the series of processes illustrated in FIG. 13 from the display data DFA, for example.

According to the present embodiment, the display data acquisition unit 241 may perform an operation for acquiring the display data DFC including the P learning data 222 and the P low-dimensional data 235 with which the ID numbers and the labels 222B are respectively associated, for example. According to the present embodiment, the control unit 131 may generate a two-dimensional scatter diagram and a preview column using the display data DFC and subject the display processing unit 121 to control to display a display image including the two-dimensional scatter diagram and the preview column, for example. According to the present embodiment, the display processing unit 121 may perform an operation for generating a two-dimensional scatter diagram corresponding to the P low-dimensional data 235 included in the display data DFC and a preview column for presenting a thumbnail of image data of at least one of the P image data 222A obtained from the learning data 222 included in the display data DFC and generating a display image including the two-dimensional scatter diagram and the preview column and outputting the generated display image to the display apparatus 41 in response to control by the control unit 131, for example.

Figure 14:
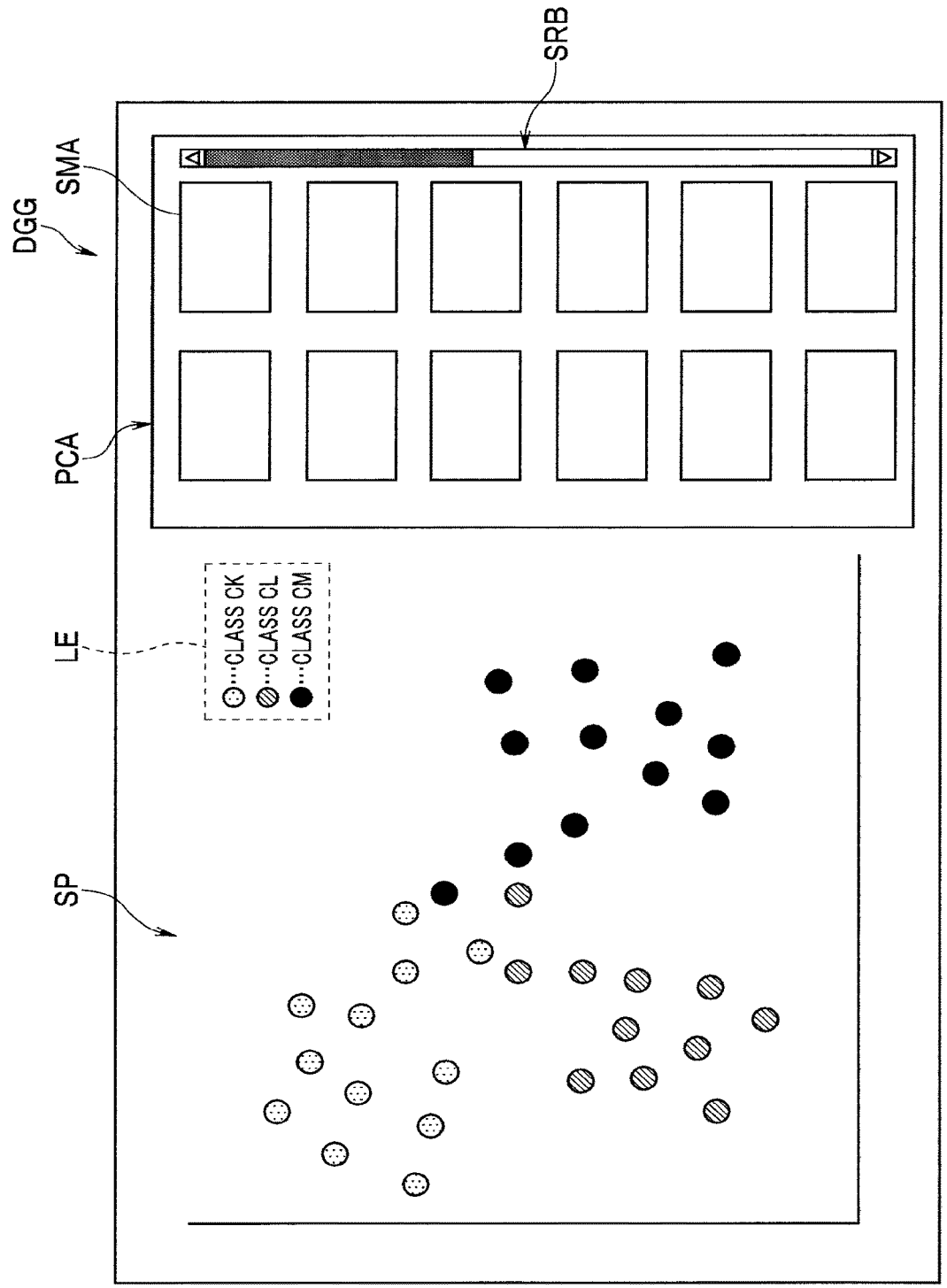
FIG. 14 is a diagram illustrating an example of a display image to be displayed depending on processing of the information display system according to the embodiment.

According to the operation of each of the units as described above, a display image DGG as illustrated in FIG. 14 is displayed on the display apparatus 41, for example. FIG. 14 is a diagram illustrating an example of a display image to be displayed depending on processing of the information display system according to the embodiment.

The display image DGG illustrated in FIG. 14 includes a similar two-dimensional scatter diagram SP to the two-dimensional scatter diagram SP illustrated in FIG. 6A, a similar legend LE to the legend LE illustrated in FIG. 6A, and a preview column PCA.

In the preview column PCA in the display image DGG, thumbnails SMA respectively corresponding to at least some of P image data 222A are displayed as a list. In the preview column PCA in the display image DGG, thumbnails to be displayed as a list within the preview column PCA can be changed by a scroll bar SRB arranged in the preview column PCA.

According to the present embodiment, if the control unit 131 has detected that an instruction to select one of the respective thumbnails displayed as a list within the preview column PCA has been issued in the input I/F 31, for example, the control unit 131 may perform processing for setting one plot point corresponding to the one thumbnail as a base point. In other words, according to such processing, the base point in the two-dimensional scatter diagram generated by the display processing unit 121 is set as a plot point corresponding to the one image data selected from among the P image data 222A.

Figure 15:
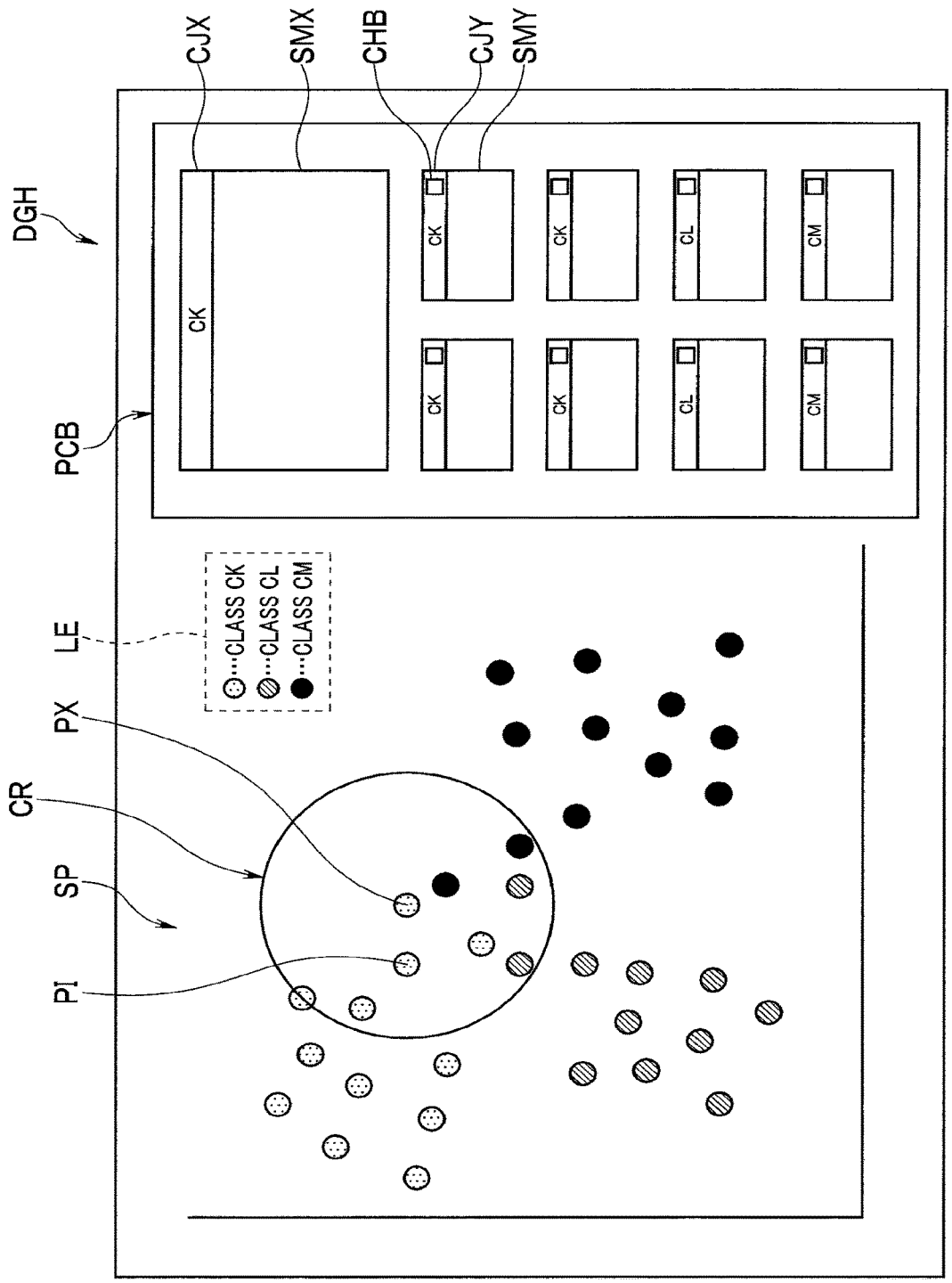
FIG. 15 is a diagram illustrating an example of a display image to be displayed depending on processing of the information display system according to the embodiment.

According to the present embodiment, if a plot point PX is set as a base point, for example, the display processing unit 121 may perform an operation for generating a display image DGH as illustrated in FIG. 15 using display data DFB and DFC and output the generated display image DGH to the display apparatus 41 in response to control by the control unit 131. FIG. 15 is a diagram illustrating an example of a display image to be displayed depending on processing of the information display system according to the embodiment.

The display image DGH illustrated in FIG. 15 includes a two-dimensional scatter diagram SP to which a similar circle CR to the circle CR illustrated in FIG. 8 is added, a similar legend LE to the legend LE illustrated in FIG. 6A, and a preview column PCB.

The preview column PCB includes a thumbnail SMX of image data 222A corresponding to the plot point PX and class information CJX having a display format capable of directly editing a classification result represented by a label 222B used for generating the plot point PX. The preview column PCB includes a thumbnail SMY of the image data 222A corresponding to each of plot points other than the plot point PX within a range of the circle CR and class information CJY having a display format capable of directly editing a classification result represented by the label 222B used for generating each of the plot points. In other words, the display image DGH includes a thumbnail of one image data corresponding to a base point, information representing a class to which the base point belongs, a thumbnail of image data corresponding to each of the plot points other than the base point within the range of the circle CR, and information representing a class to which each of the plot points other than the base point within the range of the circle CR belongs. In the preview column PCB, the thumbnail SMX is displayed in a larger size than the size of the thumbnail SMY. In the preview column PCB, a check box CHB capable of changing a display state of the one plot point corresponding to the one desired thumbnail SMY among the respective plot points included in the two-dimensional scatter diagram SP is arranged.

Accordingly, the user can judge whether or not the class to which the plot point PX belongs is correct and judge whether or not the classes to which one or more desired plot points other than the plot point PX within the range of the circle CR respectively belong are correct by referring to each of the information displayed on the preview column PCB, for example.

If the user judges that the class to which the plot point PX belongs is not correct, for example, based on each of the information displayed on the preview column PCB, the user can correct the classification result represented by the label 222B used for generating the plot point PX by issuing an instruction to correct the class information CJX corresponding to the plot point PX in the input I/F 31.

If the user judges that the class to which the one plot point other than the plot point PX within the range of the circle CR belongs is not correct, for example, based on each of the information displayed in the preview column PCB, the user can correct the classification result represented by the label 222B used for generating the one plot point by issuing an instruction to correct the class information CJY corresponding to the one plot point in the input I/F 31.

If the respective plot points other than the plot point PX within the range of the circle CR include one or more plot points PI (see FIG. 15) each having a high degree of importance, for example, the user enables each of the plot points other than the plot point PX and the plot point PI not to be displayed on the two-dimensional scatter diagram SP by issuing an instruction to check the check box CHB corresponding to the plot point PI in the input I/F 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information display method comprising:
    converting P (P≥2) high-dimensional data respectively obtained from P images each tagged with a label representing a result of classification into one of a plurality of predetermined classes to respectively acquire P low-dimensional data;
    generating a plot diagram including P plot points obtained by visualizing the P low-dimensional data each depending on the classification result represented by the label;
    generating auxiliary information corresponding to a base point and N (1≤N<P) reference points, the base point being set as one of the P plot points included in the plot diagram, the base point being visualized by using a first low-dimensional data of the base point, the N (1≤N<P) reference points being respectively set as plot points corresponding to N low-dimensional data of the N (1≤N<P) reference points, the N low-dimensional data being extracted from among a second low-dimensional data belonging to a same class as a class to which the base point belongs, by extracting in ascending order of differences from the first low-dimensional data of the base point; and
    generating a display image including the plot diagram to which the auxiliary information is added.

2. The information display method according to claim 1, wherein
    the auxiliary information includes a circle having the base point as a central point and having as a radius a distance between the base point and the one reference point corresponding to the plot point farthest from the one of the plot point among the N reference points.

3. The information display method according to claim 2, wherein
    the display image further includes information representing a ratio of a number of plot points belonging to a same class as a class to which the base point belongs within a range of the circle to a total number of plot points within the range of the circle.

4. The information display method according to claim 2, wherein
    the display image further includes information about a result of classification of plot points within a range of the circle for each class to which each of the plot points belongs.

5. The information display method according to claim 2, wherein
    the display image includes a thumbnail of one image corresponding to the base point, information representing a class to which the base point belongs, a thumbnail of an image corresponding to each of the plot points other than the base point within a range of the circle, and information representing a class to which each of the plot points other than the base point within the range of the circle belongs.

6. The information display method according to claim 1, wherein
the auxiliary information includes N line segments respectively connecting the base point and the N reference points to each other and numbers respectively representing proximities of the N reference points to the base point.

7. The information display method according to claim 1, wherein
the auxiliary information includes N line segments respectively connecting the base point and the N reference points to each other and respectively having line widths or dark hues corresponding to proximities of the N reference points to the base point.

8. The information display method according to claim 1, wherein
the base point is set as a plot point selected, among a plurality of regions obtained by dividing the plot diagram, from either a region where classes to which the plot points respectively belong are of a largest number of types or a region where an identification boundary between the classes to which the plot points respectively belong is most complex.

9. The information display method according to claim 1, wherein
the base point is set as a plot point corresponding to one image selected from among the P images.

10. An information display system comprising one or two or more processors, wherein
the one or two or more processors
converts P (P≥2) high-dimensional data respectively obtained from P images each tagged with a label representing a result of classification into one of a plurality of predetermined classes to respectively acquire P low-dimensional data;
generates a plot diagram including P plot points obtained by visualizing the P low-dimensional data each depending on the classification result represented by the label;
generates auxiliary information corresponding to a base point and N (1≤N<P) reference points, the base point being set as one of the P plot points included in the plot diagram, the base point being visualized by using a first low-dimensional data of the base point, the N (1≤N<P) reference points being respectively set as plot points corresponding to N low-dimensional data of the N (1≤N<P) reference points, the N low-dimensional data being extracted from among a second low-dimensional data belonging to a same class as a class to which the base point belongs, by extracting in ascending order of differences from the first low-dimensional data of the base point; and
generates a display image including the plot diagram to which the auxiliary information is added.

11. A non-transitory computer readable storage medium storing a program, the storage medium comprising:
a code for converting P (P≥2) high-dimensional data respectively obtained from P images each tagged with a label representing a result of classification into one of a plurality of predetermined classes to respectively acquire P low-dimensional data;
a code for generating a plot diagram including P plot points obtained by visualizing the P low-dimensional data each depending on the classification result represented by the label;
a code for generating auxiliary information corresponding to a base point and N (1≤N<P) reference points, the base point being set as one of the P plot points included in the plot diagram, the base point being visualized by using a first low-dimensional data of the base point, the N (1≤N<P) reference points being respectively set as plot points corresponding to N low-dimensional data of the N (1≤N<P) reference points, the N low-dimensional data being extracted from among a second low-dimensional data belonging to a same class as a class to which the base point belongs, by extracting in ascending order of differences from the first low-dimensional data of the base point; and
a code for generating a display image including the plot diagram to which the auxiliary information is added.

* * * * *